T. & J. CLIFFORD.

CLAY AND ORE CRUSHER.

No. 7,645.

Reissued May 1, 1877.

*Fig. 1.*

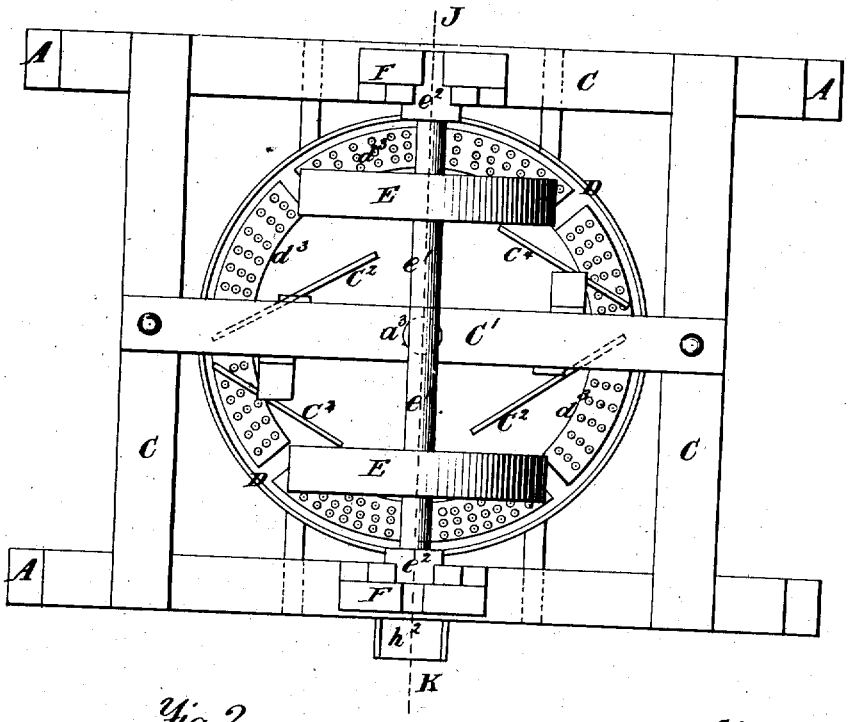

*Fig. 2.*

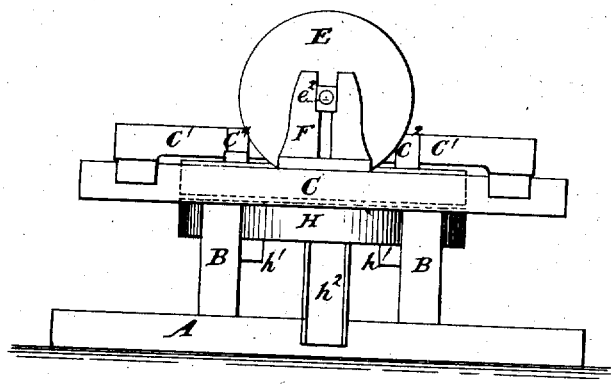

*Fig. 3.*

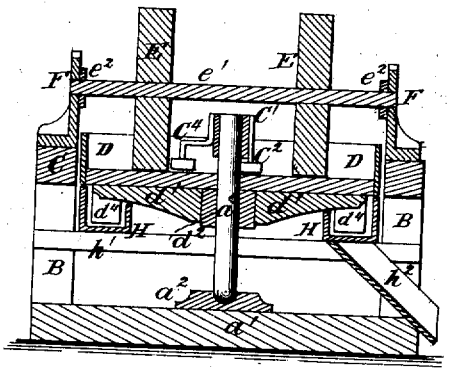

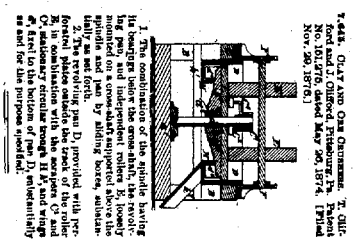

7,645. CLAY AND ORE CRUSHERS. T. CLIFFORD and J. CLIFFORD, Cincinnati, O. Patented Oct. 4, 1859; Reissued May 1, 1877. (Patent No. 25,276, dated Nov. 20, 1876.)

1. The combination of the spindle having its bearings upon the arms-shaft, the revolving pan D, provided with projections, and the stationary plate E, supported and mounted on a cross-shaft supported above the spindle and pan by sliding boxes, substantially as set forth.

2. The revolving pan D, provided with projections, in combination with the stationary plate E, in combination with the scrapers C' and C2, stationary circular trough H A', and wings d2, fixed to the bottom of pan D, substantially as and for the purpose specified.

Witnesses:
A. Ruppert.
Wm. H. Bates.

James Clifford
Thomas Clifford
Inventors.
D. P. Holloway & Co
Attys.

UNITED STATES PATENT OFFICE

THOMAS CLIFFORD AND JAMES CLIFFORD, OF PITTSBURG, PA.

IMPROVEMENT IN CLAY AND ORE CRUSHERS.

Specification forming part of Letters Patent No. 151,275, dated May 26, 1874; reissue No. 7,645, dated May 1, 1877; application filed November 29, 1876.

*To all whom it may concern:*

Be it known that we, THOMAS CLIFFORD and JAMES CLIFFORD, of Pittsburg, in the county of Allegheny and State of Pennsylvania, have invented certain new and useful Improvements in Clay and Ore Crushers; and we do hereby declare that the following is a full, clear, and exact description thereof, reference being had to the accompanying drawings, and to the letters of reference marked thereon, which form a part of this specification.

This invention relates to machines for crushing clay, ores, or other hard substances, in which the pan receiving the material to be ground revolves under a pair of heavy rollers, mounted above it in such a manner that they will be rotated by the revolving pan by friction.

Our improvement consists, first, in loosely mounting both crushing-rollers on a single shaft extending horizontally across the pan, and resting in sliding boxes in standards of the frame-work; secondly, of certain hereinafter more fully specified devices, used, in combination with the revolving pan and rollers, for keeping the material in the path of the rollers until ground to the required fineness, and then discharging it.

In the accompanying drawings, Figure 1 is a top view or plan of our improved machine. Fig. 2 is a side elevation thereof. Fig. 3 is a cross-section through J K.

Upon the central cross-piece $a^1$ of a frame, of which A A form the longitudinal pieces, rests a block, $a^2$, countersunk at its center for the reception and bearing of vertical shaft $a^3$. Upon the supports B B, which connect the upper and lower frames, rests the frame C, with movable cross-pieces $C^1$ attached thereto by bolts or other suitable means. For the purpose of holding the said vertical shaft in position at its upper extremity, an orifice is formed for its reception in the center of said cross-piece $C^1$. Firmly secured to vertical shaft $a^3$ is the circular pan D, supported underneath by strong arms $d^1$, radiating from boss $d^2$. Into the bed of pan D, and outside of the track of rollers E E, are inserted a series of movable plates, $d^3$, having countersunk perforations in any required number. These plates $d^3$ are replaced at pleasure by other plates having larger or smaller perforations, or other means of outlet. That portion of the bed of pan D over which the rollers continually pass is made detachable, so as to be readily replaced when required. Suitable rollers E E are placed in the said pan D, and, when in operation, are rotated by friction caused by their contact with the material being ground in the pan. The said rollers E E work loosely on the shaft $e^1$, which is supported by brackets F F, in which the sliding bearings $e^2$ are placed. To the cross-piece $C^1$ are attached suitable scrapers $C^2$ and $C^4$. Underneath the pan D, of the width, or thereabout, of plates $d^3$, and immediately under them, is placed a stationary circular trough or hopper, H, supported and held in position by the timbers $h^1$, or by other suitable means. In the bottom of this trough or hopper is an orifice, from which runs the spout or outlet, $h^2$. Attached to the arms $d^1$ are two or more scrapers, $d^4$, so arranged as to work in the said trough H, to carry the material deposited therein to the outlet $h^2$.

In the construction of our improved machine we do not restrict ourselves to any particular material from which to make the whole or any part thereof.

In the operation of this machine it will be understood that the motive power is applied to vertical shaft $a^3$ by bevel-wheels or other suitable means, whence the pan D is rotated and the rollers E E turned by friction. The material to be ground is placed in the said pan D, and kept continually in motion by means of scrapers $C^2$ and $C^4$, the said scrapers $C^2$ $C^2$ throwing the material over the perforated plates $d^3$, and that portion of it pulverized sufficiently passes through the perforations, while that portion of it requiring more grinding is again thrown under the rollers by means of scrapers $C^4$ $C^4$. This process is continued until the whole of the material thrown into the pan is thoroughly pulverized and passed into the trough or hopper H underneath, in which it is drawn around by means of scrapers $d^4$ to the orifice over the spout $h^2$, whence it passes out.

The principal advantages of our improvement are its simplicity of construction, its effectiveness, and the accessibility of its various parts for repair or replacement. It is also self-acting.

What we claim as our invention, and desire to secure by Letters Patent, is—

1. The combination of the spindle having its bearings below the cross-shaft, the revolving pan, and independent rollers E, loosely mounted on a cross-shaft supported above the spindle and pan by sliding boxes, substantially as set forth.

2. The revolving pan D, provided with perforated plates outside the track of the roller E, in combination with the scrapers $C^2$ and $C^4$, stationary circular trough H $h^2$, and wings $d^4$, fixed to the bottom of pan D, substantially as and for the purpose specified.

In testimony that we claim the foregoing we have hereunto set our hands this 19th day of July, 1876.

THOMAS CLIFFORD.
JAMES CLIFFORD.

Witnesses to the signature of THOS. CLIFFORD:

J. S. EDGAR,
D. P. HOLLOWAY.

Witnesses to the signature of JAMES CLIFFORD:

J. B. GOULD,
I. I. BRAME.